US012795300B2

(12) United States Patent
Neubauer et al.

(10) Patent No.: US 12,795,300 B2
(45) Date of Patent: Nov. 10, 2026

(54) SOUND ACTUATOR WITH ROBUST POSITIONING OF MAGNETIC POLE PLATE PACKETS

(71) Applicant: Continental Engineering Services GmbH, Frankfurt am Main (DE)

(72) Inventors: Philipp Neubauer, Griesheim (DE); Dimitrios Patsouras, Hofheim (DE); Johannes Kerkmann, Hofheim (DE); Karsten Moritz, Darmstadt (DE); Robert Joest, Frankfurt am Main (DE); Stephan Eisele, Darmstadt (DE); Pascal Köhler, Darmstadt (DE); Robert Wick, Darmstadt (DE); Jens Friedrich, Aschaffenburg (DE); Stefan Heinz, Hofheim (DE)

(73) Assignee: Continental Engineering Services GmbH, Frankfurt (DE)

( * ) Notice: Subject to any disclaimer, the term of this patent is extended or adjusted under 35 U.S.C. 154(b) by 167 days.

(21) Appl. No.: 18/713,070

(22) PCT Filed: Nov. 18, 2022

(86) PCT No.: PCT/DE2022/200272
§ 371 (c)(1),
(2) Date: May 23, 2024

(87) PCT Pub. No.: WO2023/093950
PCT Pub. Date: Jun. 1, 2023

(65) Prior Publication Data

US 2025/0030983 A1 Jan. 23, 2025

(30) Foreign Application Priority Data

Nov. 26, 2021 (DE) .................... 10 2021 213 377.0

(51) Int. Cl.
*H04R 9/02* (2006.01)
*H04R 31/00* (2006.01)

(52) U.S. Cl.
CPC ........... *H04R 9/025* (2013.01); *H04R 31/006* (2013.01); *H04R 2209/024* (2013.01); *H04R 2400/11* (2013.01)

(58) Field of Classification Search
None
See application file for complete search history.

(56) References Cited

U.S. PATENT DOCUMENTS

| | | | |
|---|---|---|---|
| 2003/0103642 | A1 | 6/2003 | Kam |
| 2009/0257617 | A1 | 10/2009 | Ikeda et al. |

(Continued)

FOREIGN PATENT DOCUMENTS

| | | | |
|---|---|---|---|
| CN | 101321409 | A | 12/2008 |
| EP | 4061007 | A1 | 9/2022 |

(Continued)

OTHER PUBLICATIONS

International Search Report (PCT/ISA/210) with translation and Written Opinion (PCT/ISA/237) mailed on Apr. 24, 2023, by the European Patent Office as the International Searching Authority for International Application No. PCT/DE2022/200272. (33 pages).

(Continued)

*Primary Examiner* — Quynh H Nguyen
(74) *Attorney, Agent, or Firm* — Buchanan Ingersoll & Rooney PC

(57) ABSTRACT

An actuator, including an electric drive for converting electrical signals into mechanical forces and/or deflections, is disclosed. The drive having at least one coil through which the current of the electrical signal can flow and having at least two magnets which can electromagnetically interact with the coil. The actuator being designed to excite a body (Continued)

which can be connected to the actuator, in particular a flat body, to vibrate, as a result of which the body can emit acoustic sound. The two magnets each being assigned at least one pole plate, the first and the second magnet, each with the at least one associated pole plate, forming at least one first and one second magnetic pole plate packet and the actuator having a frame in which the two magnetic pole plate packets are arranged in a substantially form-fitting manner.

19 Claims, 6 Drawing Sheets

(56) References Cited

U.S. PATENT DOCUMENTS

| | | | | |
|---|---|---|---|---|
| 2010/0022169 | A1 * | 1/2010 | Asen | B24D 7/16 451/28 |
| 2020/0275189 | A1 | 8/2020 | Cho et al. | |
| 2021/0021935 | A1 | 1/2021 | Yan et al. | |
| 2021/0112343 | A1 | 4/2021 | Kim | |
| 2022/0337955 | A1 | 10/2022 | Kim | |

FOREIGN PATENT DOCUMENTS

| | | | |
|---|---|---|---|
| JP | S62224198 | A | 10/1987 |
| JP | 2002223495 | A | 8/2002 |
| KR | 20110126317 | A | 11/2011 |
| KR | 101765679 | B1 | 8/2017 |
| WO | 2021054708 | A1 | 3/2021 |
| WO | 2021075815 | A1 | 4/2021 |
| WO | 2023089242 | A1 | 5/2023 |

OTHER PUBLICATIONS

Invitation to Pay Additional Fees (Form PCT/ISA/206) corresponding to PCT/DE2022/200272 issued on Feb. 15, 2023. (17 pages).

Search Report dated Aug. 25, 2023, by the German Patent Office for Application No. 10 2022 212 289.5, and a Machine translation. (18 pages).

Invention Disclosure by Continental Automotive GmbH, Dated Sep. 18, 2020, File No. 2020E045467 DE, with Machine translation. (34 pages).

Invention Disclosure by Continental Automotive GmbH, Dated May 19, 2021, File No. 2021E03380 DE, with Machine translation. (26 pages).

Office Action (The First Office Action) issued Aug. 14, 2024, by the State Intellectual Property Office of People's Republic of China in corresponding Chinese Patent Application No. 202290000758.3 and an English machine translation of the Office Action.(6 pages).

Office Action (Notice pursuant to Article 94(3) EPC) issued Jun. 12, 2026, by the European Patent Office in corresponding European Patent Application No. 22 817 087.4-1207 and an English machine translation of the Office Action. (14 pages).

* cited by examiner

SOUND ACTUATOR WITH ROBUST POSITIONING OF MAGNETIC POLE PLATE PACKETS

CROSS REFERENCE TO RELATED APPLICATIONS

This application is the U.S. National Phase Application of PCT International Application No. PCT/DE2022/200272, filed Nov. 18, 2022, which claims priority to German Patent Application No. 10 2021 213 377.0, filed Nov. 26, 2021, the contents of such applications being incorporated by reference herein.

FIELD OF THE INVENTION

The invention relates to an actuator and to a method for producing an actuator.

SUMMARY OF THE INVENTION

An aspect of the invention is based on proposing an actuator for converting electrical signals into mechanical forces and/or deflections, which actuator is of robust design and/or is simple and/or inexpensive to manufacture and/or has a relatively good performance.

It is preferred that the two magnets are each assigned two pole plates, the first and the second magnet, each with the two pole plates, forming at least one first and one second magnetic pole plate packet and the actuator having a frame in which the two magnetic pole plate packets are arranged in a substantially form-fitting manner. This form-fitting is preferably substantially free of play.

The actuator is preferably designed such that the two magnets are arranged such that they can move to a limited extent relative to the housing.

The coil or the coil carrier is preferably connected to the housing and designed to produce an electromagnetic field when an electric current flows through the coil, the electromagnetic field causing relative movement of the magnets or magnetic pole plate packets in relation to the coil or the coil carrier.

The two magnetic pole plate packets are preferably not connected to the frame in a materially bonded manner.

The two magnetic pole plate packets are preferably fitted or arranged in the frame in a force-fitting and form-fitting manner.

The frame expediently has at least one first and one second recess on opposite outer surfaces, these recesses being designed to be, in particular partially or completely, delimited to the inside, in particular by means of a boundary in the form of at least one projection or stop or a wall or partial wall, and an air gap in which the coil is arranged being formed between these recesses, a respective one of the magnetic pole plate packets being arranged in each of these two recesses in a form-fitting manner. These recesses are particularly preferably open in relation to each other and/or in relation to the air gap situated between them or merge with each other as a space, the delimitation between the recesses or between the recesses and the air gap in each case very particularly preferably being performed by means of the boundary or the projection or the stop or being marked or defined by this.

It is preferred that the fixing of the two magnetic pole plate packets in the two recesses is formed/implemented at least by a form-fitting connection and by the mutual attraction force of the two magnets, in particular additionally the two recesses being formed as a press-fit with respect to the magnetic pole plate packets, as a result of which the force-fitting connection is made by way of example. The recesses and the magnetic pole plate packets are preferably designed such that self-clamping takes place.

It is expedient that the coil is arranged in a coil carrier in a fixed manner, in particular in a form-fitting manner, and the coil carrier with the coil is arranged in a feedthrough in the frame, which feedthrough forms the air gap, and this feedthrough is preferably formed substantially perpendicularly to the orientation of the two recesses in the magnetic pole plate packets, the coil carrier with the coil being arranged contactlessly in relation to the magnetic pole plate packets.

The frame is preferably formed from plastic or a non-magnetic metal, in particular as fiber-reinforced plastic, particularly preferably glass fiber-reinforced or carbon fiber-reinforced plastic.

The edges which surround the recesses of the frame for receiving the magnetic pole plate packets are preferably of chamfered design, at least with respect to the inside of the edge for easier fitting of the magnetic pole plate packets.

It is preferred that the actuator has two spring elements which are designed and arranged such that they elastically fix the coil carrier on the two opposite sides, where it protrudes from the air gap.

The spring elements are expediently designed and arranged such that they are elastic in the direction of the feedthrough/the air gap and are in particular substantially rigid with respect to other directions.

It is preferred that the spring elements are each connected to the coil carrier in a form-fitting manner, in particular by means of fitting a lug or an arm of the spring element into a groove and/or recess in the coil carrier, the spring elements being designed and arranged such that they are resiliently supported on the opposite outer surfaces, on which the feedthrough openings of the air gap are arranged, in relation to an outer surface of the frame and/or in relation to an outer surface of a magnetic pole plate packet and are connected to the frame and/or at least one of the magnetic pole plate packets, in particular in a materially bonded manner, for example in a welded manner.

The magnetic pole plate packets in the respective recess are preferably fitted/mounted on three sides, for example supported on three sides from top to bottom or on the right and left and adjacent to the air gap, and/or the magnetic pole plate packets are expediently mounted in the respective recess in the frame on five sides, circumferentially and adjacent to the air gap.

It is expedient that the spring elements are each supported by means of a spring arm on the two magnetic pole plate packets and are connected to them, in particular in a materially bonded manner.

The actuator preferably has a housing, in which the frame together with the magnetic pole plate packets fastened/fitted in it and the coil carrier with the coil are arranged, the coil carrier being supported on two opposite inner surfaces of the housing and being mounted there and the frame with the magnetic pole plate packets being mounted such that it can move/vibrate in relation to the housing and the coil carrier.

It is expedient that the housing is at least divided into two and these two housing parts are firmly connected to each other, and the coil carrier is mounted on the two opposite inner surfaces such that it exhibits form-fitting and force-fitting mounting and fixing in the housing. In particular, the distance between the two opposing inner surfaces to/on which the coil carrier is fastened or mounted is less than the length or extent of the coil carrier with respect to this direction, in an undeflected or non-force-fittingly clamped state.

The method for producing/manufacturing an actuator, in particular an actuator according to an aspect of the invention or a preferred/exemplary actuator, is preferably configured such that a magnetic pole plate packet is fixed by a tool in each case, in particular a gripper or a mounting clamp, and in this fixed state is fitted and inserted into the respective recess in the frame until the magnetic pole plate packet is in contact with the respective boundary/projection/stop, adjacent to the air gap, of the respective recess, after which the fixing of the magnetic pole plate packets by the tools is released.

For this purpose, the actuator expediently has at least one cutout in the frame with respect to one of the two recesses, it being possible for the tool for fitting the magnetic pole plate packets to enter the at least one cutout so that the magnetic pole plate packets are each fixed in the tool during insertion as far as the stop and guided through this tool. In particular, both recesses in the frame have such a cutout for the respective tool.

The method is preferably further developed such that the coil carrier, which is connected to the frame and/or the magnetic pole plate pair, is then fitted into a two-part housing, the coil carrier being compressed in its longitudinal direction, in particular substantially parallel to the air gap, by joining the two housing parts together, after which the two housing parts are firmly connected to each other, the compression or the press-fitting of the coil carrier being maintained in the housing.

An actuator is preferably understood to mean an electrodynamic vibration exciter, and preferably likewise vice versa.

An arrangement of the coil in the air gap is preferably understood to mean a complete or partial arrangement of the coil in the air gap in the inoperative state. In particular, the actuator can be designed such that the coil protrudes from the air gap, particularly preferably on two opposite sides, in the inoperative state.

The two magnets are preferably arranged such that they form a substantially straight air gap between them, the coil being arranged in said air gap.

An inoperative state of the actuator and/or the coil is preferably understood to mean a state in which the coil is not deflected and/or in which no electrical signal is present.

A straight air gap is preferably understood to mean an air gap along a plane, in particular with an air gap length that is substantially the same throughout, the air gap length being oriented perpendicularly to this plane and the two magnets and in particular in combination with their pole plates, by way of their air gap surface forming the air gap, in particular the surface adjoining the air gap, particularly preferably being oriented substantially parallel to this plane along the air gap.

The air gap length is expediently defined by the distance between the magnets and/or the distance between the pole plates, respectively assigned to/associated with the two magnets, opposite one another.

The actuator is preferably mirror-symmetrical with respect to the plane along the air gap, in particular with the exception of the magnetization of the magnets.

The plane along the air gap is preferably understood to mean a mirror plane and vice versa, or these terms are in particular interchangeable.

The magnets are each preferably in the form of permanent magnets or alternatively preferably in the form of electromagnets.

The vertical direction of the air gap is preferably defined substantially parallel to the deflection direction of the coil in the air gap.

The term “flat body” is preferably understood to mean a body capable of vibrating in an acoustically usable manner and/or a body of which the contour substantially consists of lateral surfaces, that is to say which is in particular not solid or compact, and/or is in the form of a shell-shaped body and/or the thickness thereof, in particular the thickness of the lateral surface thereof, is 2 cm or less, expediently 0.6 cm or less, this thickness limit particularly preferably relating to at least 95% of its outer surface and/or lateral surface.

It is preferred that the two magnets have a mutually opposite/inverse orientation of the magnetization direction, in particular the magnetization direction of the two magnets being substantially parallel to the vertical direction of the air gap and/or substantially parallel to the deflection direction of the coil in the air gap.

The actuator is preferably designed such that a respective pole plate is arranged above and below each magnet, particularly preferably at the poles of the magnets with respect to the vertical direction of the air gap, said pole plates in particular each having the maximum thickness at the air gap and being designed to taper away from the air gap. The design of the pole plates particularly preferably tapers continuously and the pole plate is of flat design here.

It is preferred that at least one, in particular all the, pole plate/s is/are designed such that on the respective outer surface of the pole plate facing away from the magnet, that is to say the outer surface which is arranged opposite the connecting surface or the surface adjoining the magnet, has at least one planar partial surface and/or one plateau, in particular in each case. Here, the partial surface/the plateau is formed in particular substantially perpendicularly to the plane along the air gap, or two perpendiculars to the plane along the air gap substantially span the plane of the partial surface/the plateau.

The pole plates are preferably formed from ferromagnetic material.

It is preferred that the coil is substantially rectangular and/or substantially rectangular with rounded corners. Here, the coil is in particular at least twice as wide as it is high, high being defined along the vertical direction of the air gap and wide being defined substantially perpendicularly to the air gap length and perpendicularly to the vertical direction of the air gap.

It is expedient for the coil to comprise a coil carrier which is formed from non-ferromagnetic material and in particular has a coefficient of thermal conductivity of at least 20 W/(m K). The coil carrier is expediently formed from electrically non-conductive material.

It is preferred that the coil is arranged substantially centrally and/or in the middle in the air gap in the inoperative state.

The surface of a pole plate that is respectively oriented toward the magnet is preferably substantially planar.

Optional and/or alternative embodiments are explained below with reference to figures or on their own using the reference signs.

DETAILED DESCRIPTION OF EXEMPLARY EMBODIMENTS

Figure 1:
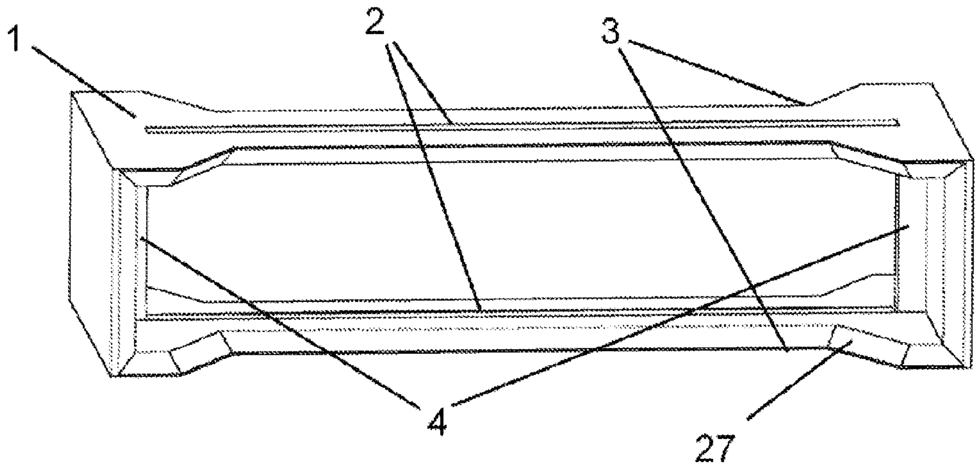
FIG. 1-12 relate to exemplary embodiments and are schematically illustrated.

An exemplary actuator has a predominantly symmetrical structure of pole plates 5 and magnets 6, which has a double air gap with two predominantly inversely oriented magnetic fields. In order to achieve this by way of example, the two magnets are arranged inversely with respect to each other in their direction of magnetization. The at least one substantially rectangular coil is arranged in the air gap such that its outgoing and returning windings interact with the positively or negatively oriented magnetic fields, as a result of which a force excitation is produced by means of Lorentz force in the case of a current-carrying coil.

The exemplary design of the arrangement allows adhesive-free assembly. On the one hand, the frame 1 allows the adhesive-free mounting of the pole plates 5 and the magnets 6 by way of guiding them during assembly and positioning them after assembly. On the other hand, joining the upper housing shell or housing half 22 and the lower housing shell 23 under a preload allows force-fitting joining with the spring elements 18 and the coil assembly 14, comprising the coil carrier and the coil.

The frame 1 provides, by way of example, the capability to guide the pole plates 5 and the magnets 6 over the side walls as well as the upper and lower boundaries of the frame during assembly. The pole plates 5 and the magnets 6 are inserted, for example, as far as a geometric stop, which is embodied as a spacer bar 4. In an exemplary embodiment in which a respective magnet 6 with two pole plates 5, called assembly A 9 or magnetic pole plate packet, is inserted into both sides of the frame 1 and the polarization directions of the magnets 6 are inverted (called assembly B 10), a magnetic force 12 acts between the opposing pole plates of the two assembles A 9 or the magnetic pole plate packets. In addition, a magnetic force 11 also acts between the magnets 6 and pole plates 5 of the respective assembly A 9. This causes all pole plates 5 and magnets 6 to attract each other such that they are fixed in this arrangement, positioned by the frame 1. In the preferred case of manufacture of the frame 1 by means of plastic injection molding, the demolding slopes of the injection molding tool have a positive effect on the fixing of the pole plates 5 and magnets 6 since the region of the insert into the frame 1 thus narrows as the insert length increases and additionally mechanically clamps the pole plates 6 and the magnets 5.

Recesses 3 in the frame 1 allow, by way of example, insertion of the assemblies A 9, each consisting of pole plates 5 and magnets 6, by means of an assembly tool 13. Optional mounting chamfers 27 on the frame 1 can facilitate insertion of the respective assemblies A 9 in assembly step A 7.

The frame 1, into which the pole plates 5 and the magnets 6 are inserted for example, is connected by way of example via the spring elements 18 to the upper housing shell 22 and the lower housing shell 23. At least 1 stop buffer 28 is fitted to each of the surfaces of the frame 1 that face the spring elements 18, the stop buffer mitigating the mechanical impact in the event of a sharp deflection of the frame 1 in relation to the housing shells 22, 23. In this case, the stop buffer 28 can be fully integrated into the frame 1 and manufactured from the same material, but may also be an additional component, which is connected to the frame 1, for example, by an adhesive connection.

In exemplary assembly step C 15, the coil assembly 14, consisting of at least one coil 16 and at least one coil carrier 17, is inserted through the slot 2 into the frame 1.

The spring elements 18 are fitted to the coil assembly 14 in assembly step D 21, for example. The spring elements 18 rest on the end face of the coil assembly 14. In this case, the spring elements 18 have recesses at those points at which the coil assembly 14 has mounting lugs 19, in order to thereby allow positioning. The spring elements 18 are connected to the pole plates 5 via coupling points 20. The spring elements 18 are preferably welded to the pole plates 5. As a preferred alternative, the spring elements 18, instead of being connected to the pole plates 6, are directly connected to the frame 1, for example by means of hot caulking of the plastic of the frame 1.

The frame 1, into which the pole plates 5 and the magnets 6 are inserted, is connected to the coil assembly 14, for example, via the spring elements 18. The upper housing shell 22 and the lower housing shell 23 are connected in the separating plane 26. The upper housing shell 22 and the lower housing shell are joined under a preload, so that a static compressive force 25 is produced. The static compressive force 25 acts between the upper housing shell 22 and the lower housing shell 23, as a result of which the coil assembly 14, together with the spring elements 18, is clamped in the housing. This results in a force-fitting connection. The mounting lugs 19 of the coil assembly 14 can optionally additionally engage in housing grooves 24 in the upper housing shell 22 and the lower housing shell 23 in order to establish an additional form-fitting connection. Combining the two housing shells 22, 23 for producing the static compressive force 25 preferably takes place using a friction welding process or a laser welding process, which is particularly preferably executed with force-displacement-controlled machines.

Joining the upper housing shell 22 and the lower housing shell 23 in the separating plane 26 as in the example creates the static compressive force 25 which connects the spring elements 18 and the coil assembly 14 in a force-fitting manner. A compensating layer 29 composed of elastic material is preferably inserted between the spring elements 18 and one of the housing shells 22, 23 and/or between the spring elements 18 and the coil assembly 14, as a result of which the static compressive force 25 is introduced in a manner more evenly distributed over the force-transmitting surfaces. The compensating layer can be composed of plastic, elastomers, silicones or rubber, for example. A perforated and/or curved metal version (e.g.: leaf spring, plate spring) is also possible.

FIG. 1: Exemplary embodiment of a frame 1, which has slots 2 for passing a coil and/or a coil carrier through, recesses 3 for clearing space for assembly tools, and spacer bars 4 for positioning or aligning magnets and pole plates. The frame 1 can optionally have, as an assembly aid, mounting chamfers 27 which can be made on some or all of the insert edges.

Figure 2:
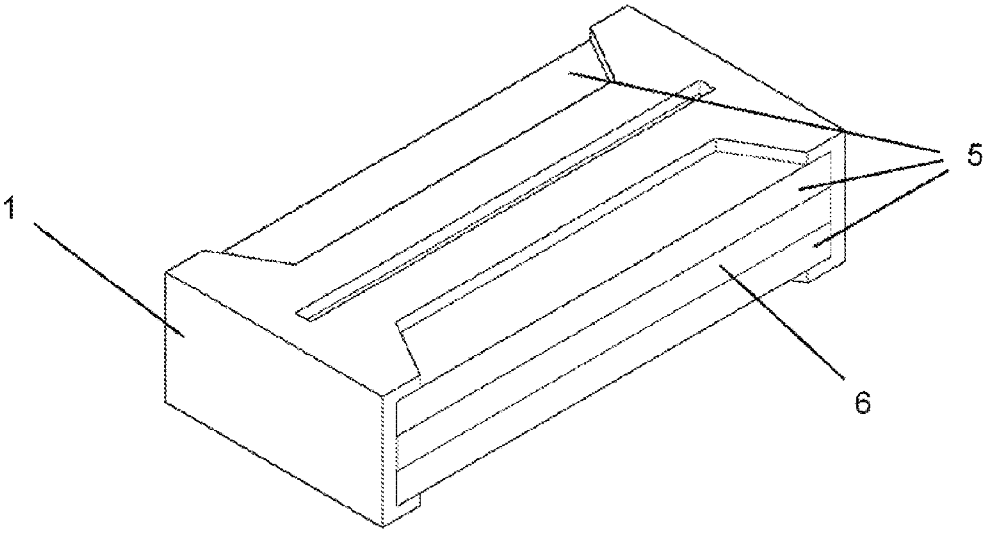

FIG. 2: Exemplary embodiment of a frame 1, which surrounds the pole plates 5 and the magnets 6. The in each case at least one pole plate 5 touches the at least one magnet 6 on at least one of its sides, optionally also via a thin intermediate layer, such as an adhesive layer for example. The frame 1 is embodied such that it can accommodate at least one assembly comprising the at least one pole plate 5 and the at least one magnet and completely or partially surrounds it on at least 3 sides.

Figure 3:
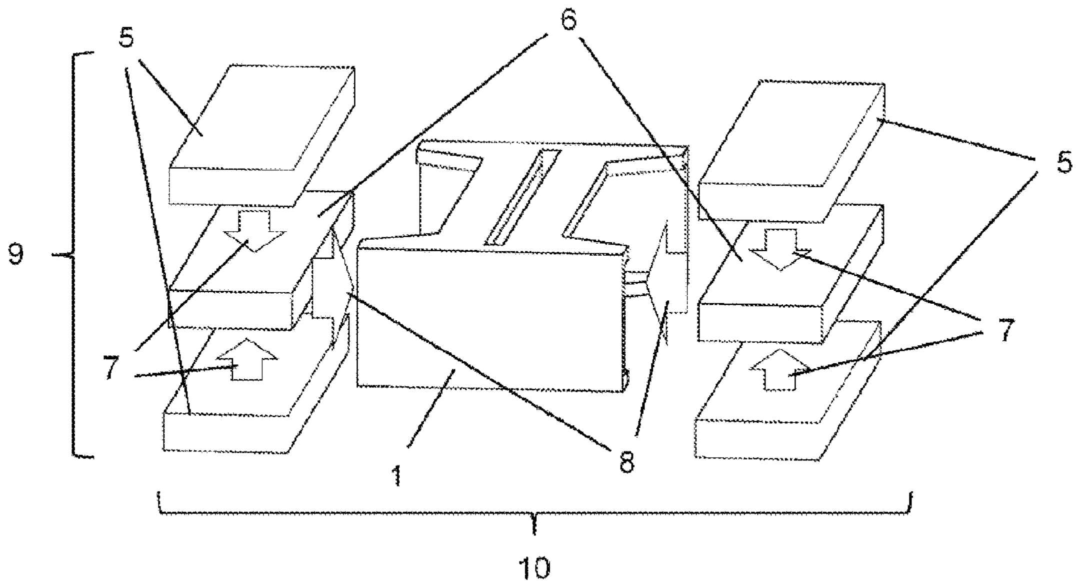

FIG. 3: Exemplary embodiment of the mounting of pole plates 5 and magnets 6 in a frame 1. In assembly step A 7, the at least one pole plate 5 is connected to the at least one magnet 6, as a result of which the assembly A 9 is produced. The connections in assembly step A 7 can be established, for example, by means of adhesive connection or in an adhesive-free manner by way of the magnetic attraction force between the pole plate 5 and the magnet 6. At the time of assembly step A 7, the magnets can selectively optionally already be pre-magnetized or be in an unmagnetized state. The joined assembly A 9 is inserted into the frame 1 in assembly step B 8, as a result of which the assembly B 10 is created. The connections in assembly step B 8 can be established, for example, by means of adhesive connection or in an adhesive-free manner by way of the magnetic attraction force between the pole plate 5 and the magnet 6.

Figure 4:
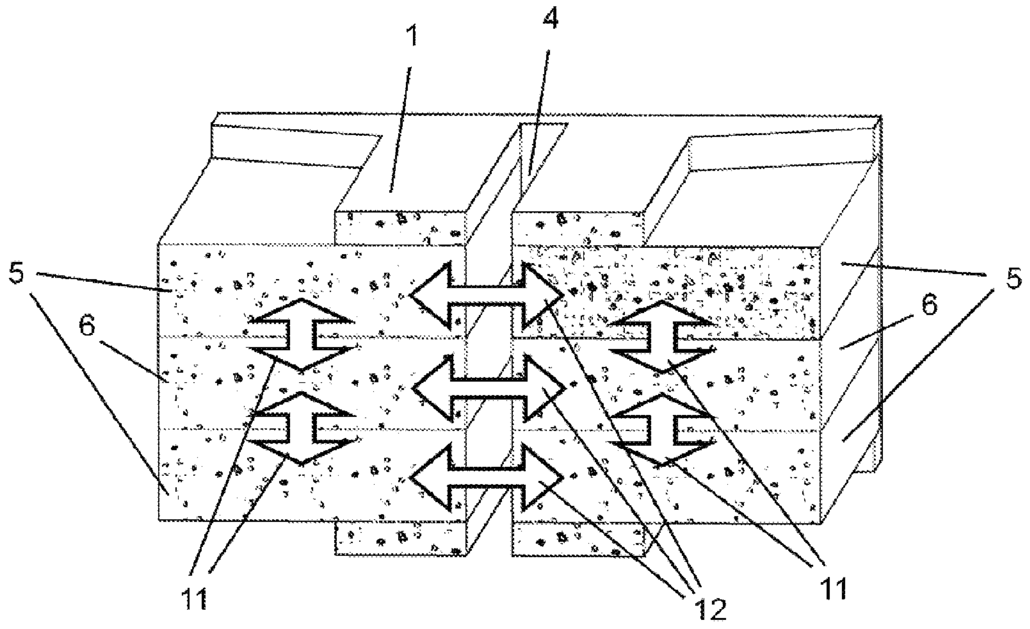

FIG. 4: Sectional illustration through an exemplary embodiment of a frame 1 with pole plates 5 and magnets 6. The magnetic forces within the assembly A 11 hold the at least one pole plate 5 and the at least one magnet 6 together. The magnetic forces within the assembly B 12 ensure that the pole plates and the magnets of the respective assemblies A are attracted to each other. In this case, the frame 1 positions the pole plates 5 and magnets 6 in relation to each other and aligns them. The adjacent assemblies A are spaced apart in the frame 1 by at least one spacer bar 4. The entire assembly B is joined and held by way of combining the magnetic attraction forces 11, 12 and the frame 1.

Figure 5:
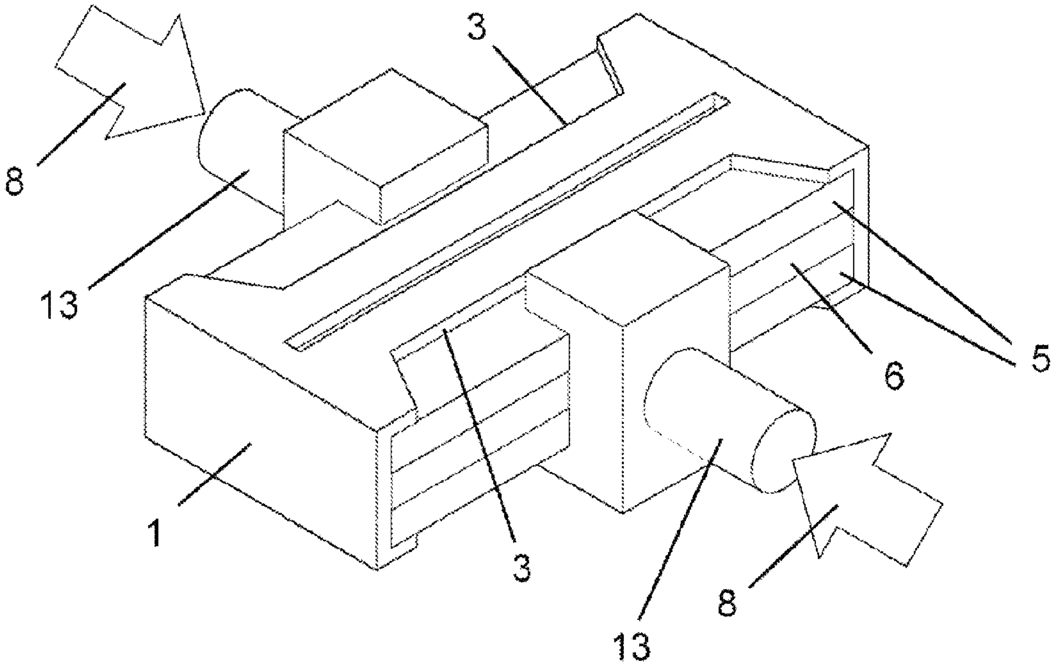

FIG. 5: Exemplary embodiment of the process of mounting pole plates 5 and magnets 6 into the frame 1. Here, the assembly tools 13 grab the stack comprising the at least one magnet 6 and the at least one pole plate 5 (assembly A 9). On the basis of assembly step B 8, the at least one magnet 6 and the at least one pole plate 6 are inserted into the frame 1. The recesses 3 in the frame 1 allow engagement of the assembly tool 13.

Figure 6:
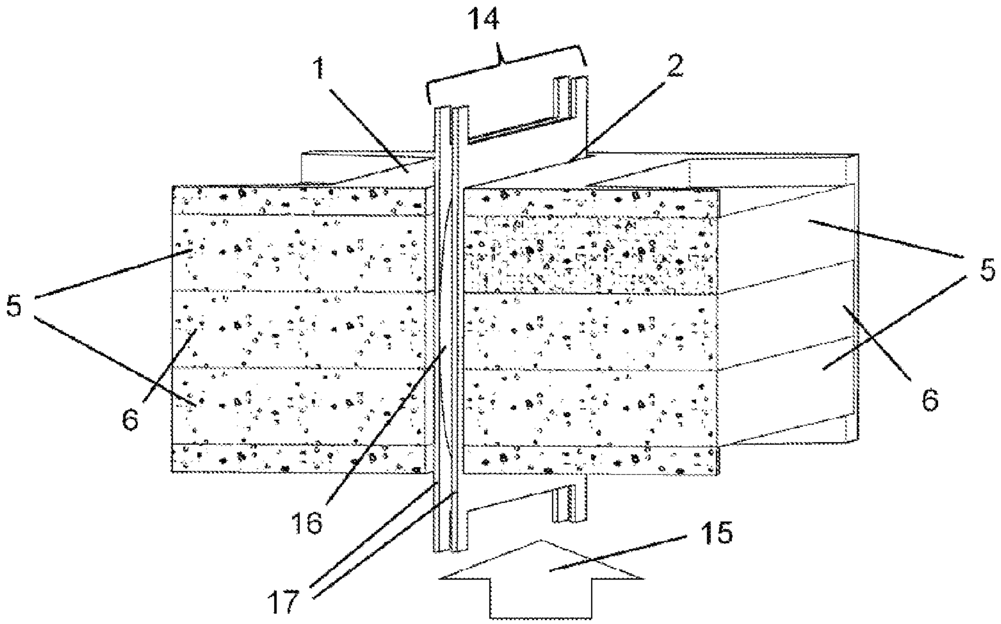

FIG. 6: Sectional illustration through an exemplary embodiment of a frame 1 with pole plates 5 and magnets 6. In assembly step C 15, the coil assembly 14, consisting of at least one coil 16 and at least one coil carrier 17, is inserted into the frame 1 through the slot 2.

Figure 7:
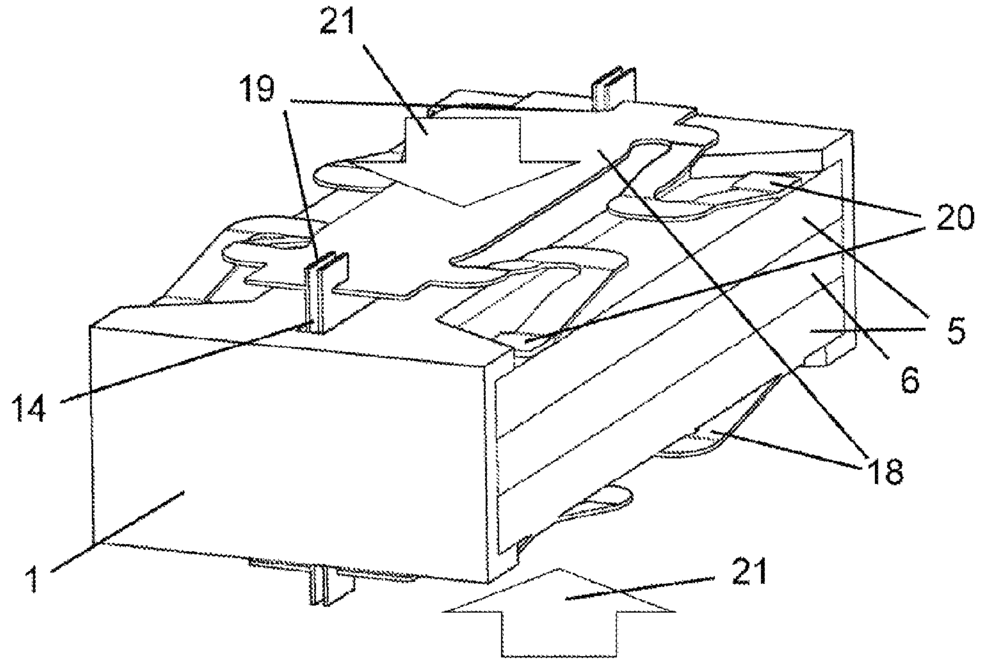

FIG. 7: Exemplary embodiment of an actuator with spring elements 18. The spring elements 18 are fitted to the coil assembly 14 in assembly step D 21. The spring elements 18 rest on the end face of the coil assembly 14. In this case, the spring elements 18 have recesses at those points at which the coil assembly 14 has mounting lugs 19, in order to thereby allow positioning. The spring elements 18 are connected to the pole plates 5 via coupling points 20.

Figure 8:
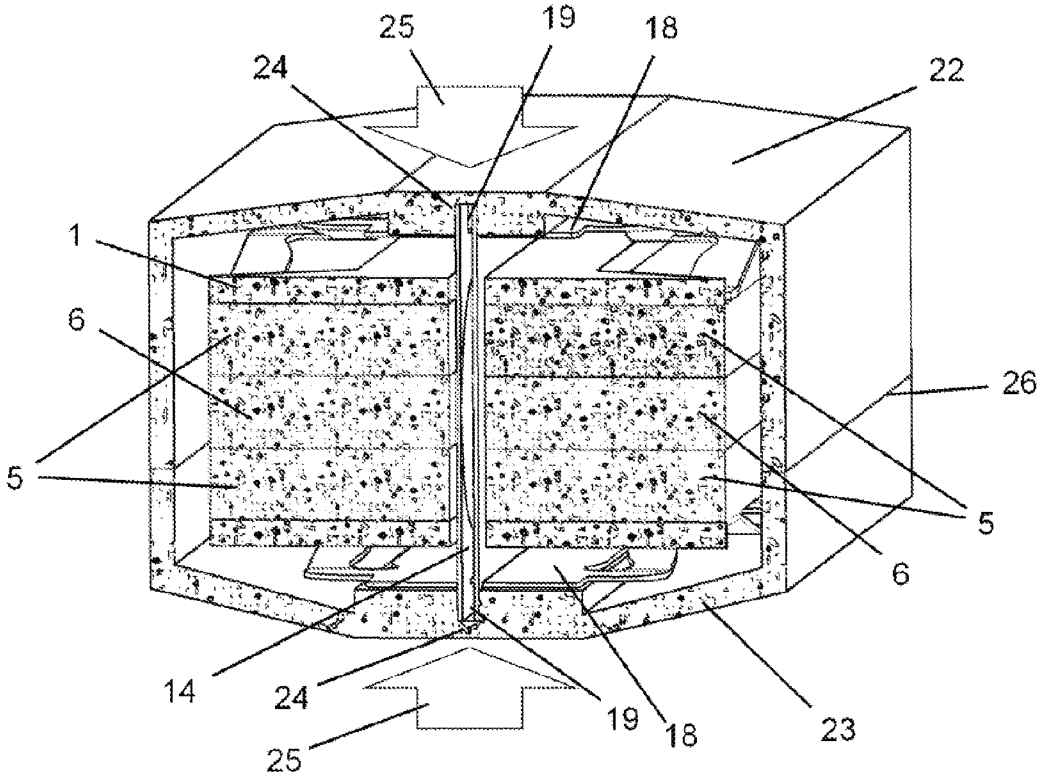

FIG. 8: Sectional illustration through an exemplary embodiment of an actuator. The frame 1, into which the pole plates 5 and the magnets 6 are inserted, is connected to the coil assembly 14 via the spring elements 18. The upper housing shell 22 and the lower housing shell 23 are connected in the separating plane 26. The upper housing shell 22 and the lower housing shell are joined under a preload, so that a static compressive force 25 is produced. The static compressive force 25 acts between the upper housing shell 22 and the lower housing shell 23, as a result of which the coil assembly 14, together with the spring elements 18, is clamped in the housing. This results in a force-fitting connection. The mounting lugs 19 of the coil assembly 14 can optionally additionally engage in housing grooves 24 in the upper housing shell 22 and the lower housing shell 23 in order to establish an additional form-fitting connection.

Figure 9:
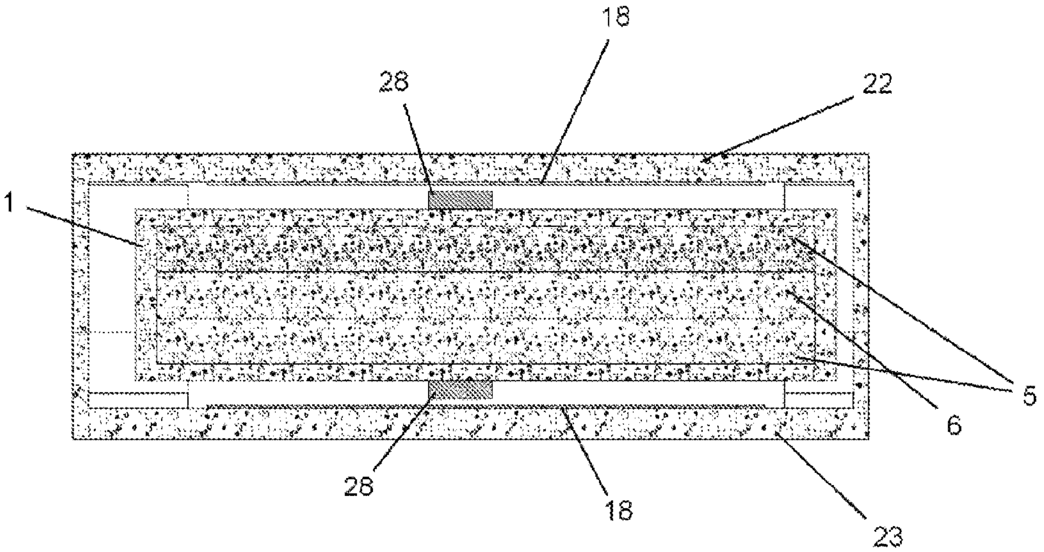

FIG. 9: Sectional illustration through an exemplary embodiment of an actuator. The frame 1, into which the pole plates 5 and the magnets 6 are inserted, is connected to the upper housing shell 22 and the lower housing shell 23 via the spring elements 18. At least 1 stop buffer 28 is fitted to each of the surfaces of the frame 1 that face the spring elements 18, the stop buffer mitigating the mechanical impact in the event of a sharp deflection of the frame 1 in relation to the housing shells 22, 23.

Figure 10:
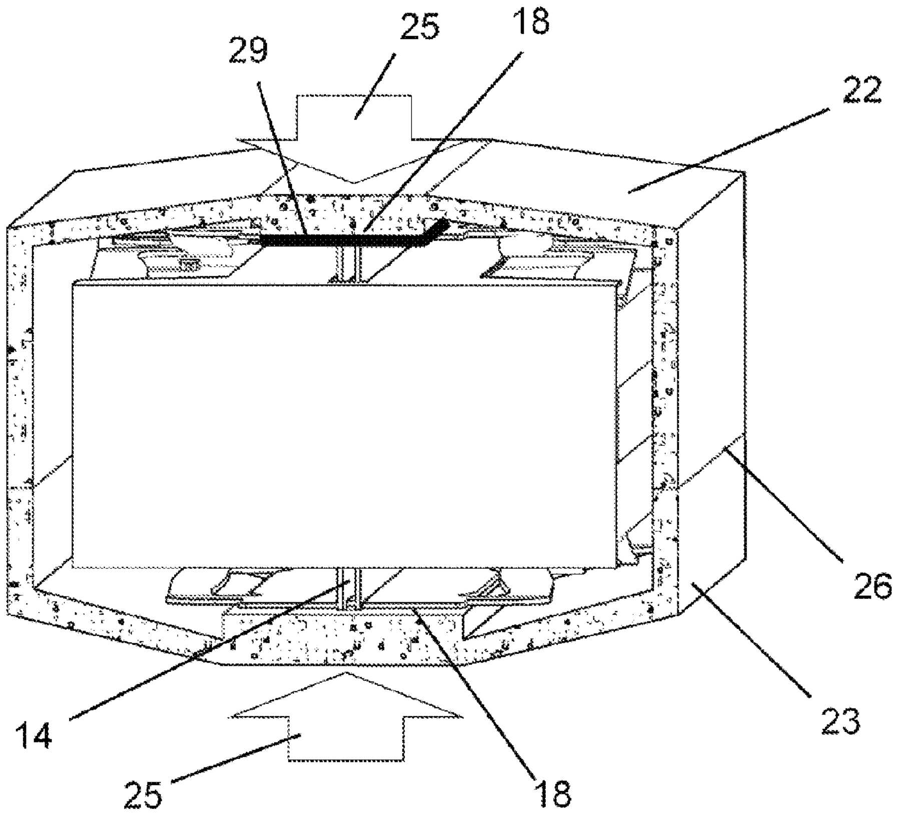

FIG. 10: Sectional illustration through an exemplary embodiment of an actuator. Joining the upper housing shell 22 and the lower housing shell 23 in the separating plane 26 creates the static compressive force 25 which connects the spring elements 18 and the coil assembly 14 in a force-fitting manner. A compensating layer 29 composed of elastic material is preferably inserted between the spring element 18 and one of the upper housing shells 22, as a result of which the static compressive force 25 is introduced in a manner more evenly distributed over the force-transmitting surfaces.

Figure 11:
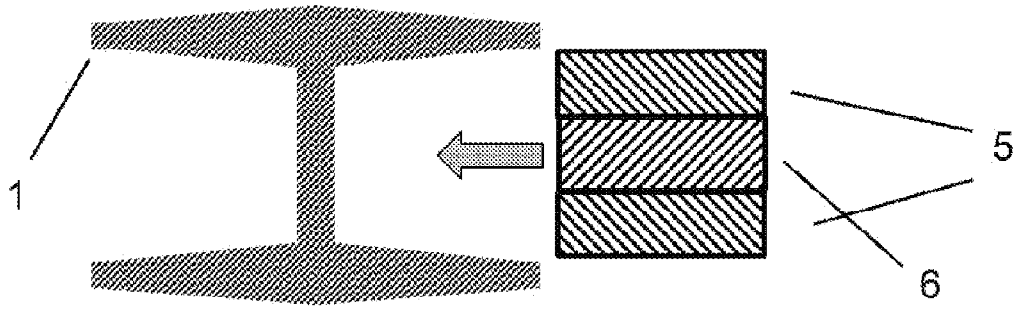

FIG. 11 shows an exemplary embodiment of the frame 1, in which the recesses have a bevel, by way of example owing to the injection molding process, this bevel being shown in a more pronounced manner here for reasons of clarity. The bevel allows the magnetic pole plate packets 6, 5 to be mounted in a force-fitting manner, in addition to the form-fitting connection.

Figure 12:
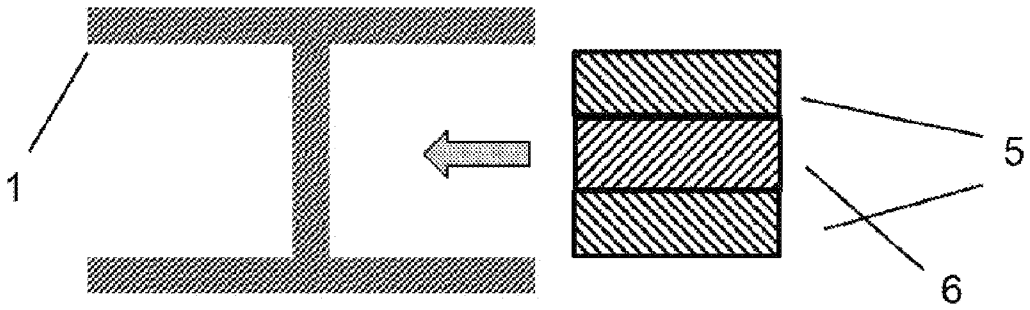

FIG. 12 shows an example analogous to that shown in FIG. 11, but without the bevel.

REFERENCE SIGNS

1. Frame
2. Slot
3. Recess
4. Spacer bar
5. Pole plate
6. Magnet
7. Assembly step A
8. Assembly step B
9. Assembly A
10. Assembly B
11. Magnetic forces within assembly A
12. Magnetic forces within assembly B
13. Assembly tool
14. Coil assembly
15. Assembly step C
16. Coil
17. Coil carrier
18. Spring elements
19. Mounting lugs
20. Coupling points
21. Assembly step D
22. Upper housing shell
23. Lower housing shell
24. Housing grooves
25. Static compressive force
26. Separating plane
27. Mounting chamfers
28. Stop buffer
29. Compensating layer

The invention claimed is:

1. An actuator, comprising:

an electric drive for converting electrical signals into mechanical forces and/or deflections, the drive having:

at least one coil through which the current of the electrical signal can flow and at least two magnets which can electromagnetically interact with the coil, the actuator being designed to excite a body which can be connected to the actuator to vibrate, as a result of which the body can emit acoustic sound, wherein the two magnets are each assigned at least one pole plate, the first and the second magnet, each with the at least one associated pole plate, forming at least one first and one second magnetic pole plate packet and the actuator having a frame in which the two magnetic pole plate packets are arranged in a substantially form-fitting manner; and two spring elements each comprising coupling points extending laterally outward from a central planar body of a respective spring element, the contact points extending into a space formed by a recess in the frame to resiliently contact a surface of a respective one of the pole plate in a direction orthogonal to the central planar body of the spring element.

2. The actuator as claimed in claim 1, wherein the two magnets are each assigned two pole plates, the first and the second magnet, each with the two pole plates, forming at least one first and one second magnetic pole plate packet and the actuator having a frame in which the two magnetic pole plate packets are arranged in the frame in a substantially form-fitting manner.

3. The actuator as claimed in claim 1, wherein the two magnetic pole plate packets are not connected to the frame in a materially bonded manner.

4. The actuator as claimed in claim 1, wherein the two magnetic pole plate packets are fitted/arranged in the frame in a force-fitting and form-fitting manner.

5. The actuator as claimed in claim 1, wherein the frame comprises:

at least one first and one second recess on opposite outer surfaces, these recesses being designed to be, partially or completely, delimited to the inside and;

an air gap in which the coil is arranged being formed between these recesses, a respective one of the magnetic pole plate packets being arranged in each of these two recesses in a form-fitting manner.

6. The actuator as claimed in claim 5, wherein the fixing of the two magnetic pole plate packets in the two recesses is formed/implemented at least by a form-fitting connection and by the mutual attraction force of the two magnets, and additionally the two recesses being formed as a press-fit with respect to the magnetic pole plate packets.

7. The actuator as claimed in claim 5, wherein the coil is arranged in a coil carrier in a fixed manner and the coil carrier with the coil is arranged in a feedthrough in the frame, which feedthrough forms the air gap, and this feedthrough is formed substantially perpendicularly to the orientation of the two recesses in the magnetic pole plate packets, the coil carrier with the coil being arranged contactlessly in relation to the magnetic pole plate packets.

8. The actuator as claimed in claim 1, wherein the frame is formed from a plastic.

9. The actuator as claimed in claim 1, wherein the two spring elements are designed and arranged such that they elastically fix the coil carrier on the two opposite sides, where it the coil carrier protrudes from the air gap.

10. The actuator as claimed in claim 9, wherein the spring elements are elastic in the direction of the feedthrough/the air gap and substantially rigid with respect to other directions.

11. The actuator as claimed in claim 9, wherein the spring elements are each connected to the coil carrier in a form-fitting manner, by fitting a lug or an arm of the spring element into a groove and/or recess in the coil carrier, the spring elements being designed and arranged such that they are resiliently supported on the opposite outer surfaces, on which the feedthrough openings of the air gap are arranged, in relation to an outer surface of the frame and/or in relation to an outer surface of a magnetic pole plate packet and are connected to the frame and/or at least one of the magnetic pole plate packets, in a materially bonded manner.

12. The actuator as claimed in claim 9, wherein the spring elements are each supported by the coupling points on the two magnetic pole plate packets and are connected to magnetic pole plate packets in a materially bonded manner.

13. The actuator as claimed in claim 1, wherein the actuator has a housing, in which the frame together with magnetic pole plate packets fastened/fitted in it and the coil carrier with the coil are arranged, the coil carrier being supported on two opposite inner surfaces of the housing and being mounted there and the frame with the magnetic pole plate packets being mounted such that it can move/vibrate in relation to the housing and the coil carrier.

14. The actuator as claimed in claim 13, wherein the housing is at least divided into two and these two housing parts are firmly connected to each other and the coil carrier is mounted on the two opposite inner surfaces such that it exhibits form-fitting and force-fitting mounting and fixing in the housing.

15. A method for producing/manufacturing an actuator as claimed in claim 1, a magnetic pole plate packet being fixed by a tool in each case and in this fixed state being fitted and inserted into the respective recess in the frame until the magnetic pole plate packet is in each case in contact with the boundary/projection/stop, adjacent to the air gap, of the respective recess, after which the fixing of the magnetic pole plate packets by the tools is released.

16. The method as claimed in claim 15, wherein the coil carrier, which is connected to the frame and/or the magnetic pole plate pair, is then fitted into a two-part housing, the coil carrier being compressed in its longitudinal direction, in particular substantially parallel to the air gap, by joining the two housing parts together, after which the two housing parts are firmly connected to each other, the compression or the press-fitting of the coil carrier being maintained in the housing.

17. The actuator as claimed in claim 2, wherein the two magnetic pole plate packets are not connected to the frame in a materially bonded manner.

18. The actuator as claimed in claim 1, wherein the coil is arranged in a coil carrier in a form fitting manner and the coil carrier with the coil is arranged in a feedthrough in the frame, which feedthrough forms the air gap, and this feedthrough is preferably formed substantially perpendicularly to the orientation of the two recesses in the magnetic pole plate packets, the coil carrier with the coil being arranged contactlessly in relation to the magnetic pole plate packets.

19. The actuator as claimed in claim 1, wherein the frame is formed from a fiber reinforced plastic.

* * * * *